(12) United States Patent
Frerking et al.

(10) Patent No.: US 9,490,891 B2
(45) Date of Patent: Nov. 8, 2016

(54) TECHNIQUES FOR IN-FLIGHT CONNECTIVITY

(71) Applicants: AT&T Intellectual Property I, L.P., Atlanta, GA (US); AT&T Mobility II LLC, Atlanta, GA (US)

(72) Inventors: Melvin D. Frerking, Eastman, GA (US); George O'Quinn Hirvela, Carrollton, GA (US); Bo Wei, Coppell, TX (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 10 days.

(21) Appl. No.: 14/524,197

(22) Filed: Oct. 27, 2014

(65) Prior Publication Data
US 2016/0119052 A1 Apr. 28, 2016

(51) Int. Cl.
| | | |
|---|---|---|
| H04B 7/185 | (2006.01) | |
| H04W 84/06 | (2009.01) | |
| H04W 24/02 | (2009.01) | |
| H04W 84/00 | (2009.01) | |

(52) U.S. Cl.
CPC ......... *H04B 7/18506* (2013.01); *H04W 24/02* (2013.01); *H04W 84/005* (2013.01); *H04W 84/06* (2013.01)

(58) Field of Classification Search
CPC .......... H04B 7/18504; H04B 7/18506; H04B 7/18508; H04W 84/06; H04W 84/005
See application file for complete search history.

(56) References Cited

U.S. PATENT DOCUMENTS

| | | |
|---|---|---|
| 6,108,539 A | 8/2000 | Ray et al. |
| 6,201,797 B1 * | 3/2001 | Leuca ............... H04B 7/18508 370/316 |
| 6,741,841 B1 | 5/2004 | Mitchell |
| 6,788,935 B1 | 9/2004 | McKenna et al. |
| 7,113,780 B2 | 9/2006 | McKenna et al. |
| 8,060,083 B2 | 11/2011 | Malosh |
| 8,068,829 B2 | 11/2011 | Lemond et al. |
| 8,073,443 B2 | 12/2011 | Wahler et al. |
| 8,078,163 B2 | 12/2011 | Lemond et al. |

(Continued)

OTHER PUBLICATIONS

Kota, S., "Broadband Satellite Networks: Trends and Challenges," IEEE Communications Society/WCNC 2005, pp. 1472-1478.

(Continued)

*Primary Examiner* — Kashif Siddiqui
(74) *Attorney, Agent, or Firm* — Abel Law Group, LLP

(57) ABSTRACT

A hybrid in-flight communications system integrates aircraft communications systems and traffic management of the aircraft air-to-ground communications and satellite communications to provide gate-to-gate connectivity to users on an aircraft. A technique for providing users with in-flight connectivity includes a first modem configured to process signals communicated with a non-terrestrial relay point. The apparatus includes a second modem configured to process signals communicated with a terrestrial relay point. The apparatus includes a wireless local area access node configured to communicate with user equipment on the aircraft and a small cell access node configured to communicate with user equipment on the aircraft. The apparatus includes a controller configured to manage first data streams between the small cell access node and the first modem and the second modem. The controller is configured to manage second data streams between the wireless local area access node and the first modem and the second modem. The apparatus may include avionics equipment.

20 Claims, 12 Drawing Sheets

(56) References Cited

U.S. PATENT DOCUMENTS

| | | |
|---|---|---|
| 8,081,968 B2 | 12/2011 | Lauer et al. |
| 8,081,969 B2 | 12/2011 | Lauer et al. |
| 8,094,605 B2 | 1/2012 | Lynch et al. |
| 8,145,208 B2 | 3/2012 | Chari et al. |
| 8,185,040 B2 | 5/2012 | Lauer et al. |
| 8,254,914 B2 | 8/2012 | Lauer et al. |
| 8,306,528 B2 | 11/2012 | Malosh |
| 8,341,298 B2 | 12/2012 | Wilber et al. |
| 8,442,519 B2 | 5/2013 | Cruz et al. |
| 8,447,292 B2 | 5/2013 | Chari et al. |
| 8,452,276 B2 | 5/2013 | Lauer |
| 8,457,627 B2 * | 6/2013 | Lauer .................. H01Q 1/007 455/431 |
| 8,526,941 B2 | 9/2013 | Tseytlin et al. |
| 8,559,391 B2 | 10/2013 | Lu et al. |
| 8,682,316 B2 | 3/2014 | Lynch et al. |
| 8,693,389 B2 | 4/2014 | Lynch et al. |
| 8,699,403 B2 | 4/2014 | Lynch et al. |
| 8,700,032 B2 | 4/2014 | Redford et al. |
| 9,185,603 B1 | 11/2015 | McCarthy |
| 9,210,102 B1 | 12/2015 | Wise |
| 2003/0018803 A1 | 1/2003 | El Batt et al. |
| 2006/0030311 A1 | 2/2006 | Cruz et al. |
| 2007/0286213 A1 * | 12/2007 | Fodor .................. H04L 12/5695 370/401 |
| 2008/0119968 A1 * | 5/2008 | Loda .................... H04L 67/025 701/3 |
| 2010/0189089 A1 | 7/2010 | Lynch et al. |
| 2012/0236784 A1 * | 9/2012 | Lynch .............. H04B 7/18508 370/316 |

OTHER PUBLICATIONS

Jahn, A., et al., "Evolution of Aeronautical Communications for Personal and Multimedia Services," IEEE Communications Magazine, Jul. 2003, pp. 2-9.

Dul, A., "Global IP Network Mobility using Border Gateway Protocol (BGP)," Network Engineering—Connexion by Boeing, The Boeing Company, Mar. 2006, pp. 1-9.

Runway Girl Network, "What if Gogo GTO never flies?," Jun. 9, 2014, downloaded from http://www.runwaygirlnetwork.com/2014/06/09/what-if-gogo-gto-never-flies/ on Jul. 7, 2014, 3 pages.

* cited by examiner

TECHNIQUES FOR IN-FLIGHT CONNECTIVITY

BACKGROUND

1. Field of the Invention

This disclosure relates to communications technology and more particularly to providing communications services to users on an aircraft.

2. Description of the Related Art

A typical communications system provides users with in-flight wide area network communications services, and, in some cases, also provides users on an aircraft with in-flight local area network communications services (e.g., a wireless local-area network (WLAN) based on the Institute of Electrical and Electronics Engineers' 802.11 standards). Although terrestrial equipment may provide wide-area network communications services to user equipment while the aircraft is on the ground and aircraft equipment may provide wide-area network communications services via a satellite communications system to a user while in flight, satellite network capacity is limited and expensive and ground access to terrestrial WLAN networks is available for only a small portion of time that a user spends on the aircraft. Accordingly, improved techniques for providing communications services to users on an aircraft are desired.

SUMMARY OF EMBODIMENTS OF THE INVENTION

A technique for providing users with in-flight connectivity includes an apparatus for communications on an aircraft including first equipment. The first equipment includes a first modem configured to process signals communicated with a non-terrestrial relay point. The first equipment includes a second modem configured to process signals communicated with a terrestrial relay point. The apparatus includes a wireless local area access node configured to communicate with user equipment on the aircraft and a small cell access node configured to communicate with user equipment on the aircraft. The apparatus includes a controller configured to manage first data streams between the small cell access node and the first equipment. The controller is configured to manage second data streams between the wireless local area access node and the first equipment. The apparatus may include avionics equipment. The controller may be further configured to manage third data streams between the avionics equipment and the first equipment. The apparatus may include an in-flight entertainment system configured to communicate with display terminals of the aircraft. The controller may be further configured to manage fourth data streams between the in-flight entertainment system and the first equipment. The apparatus may include an aircraft communications interface configured to provide aircraft personnel access to the controller. The controller may include a storage element configured to store routing information and a router configured to pass data between the small cell access node and the first equipment according to the routing information. The router may be further configured to pass data between the wireless local area access node and the first equipment according to the routing information. The apparatus may include a first antenna comprising a plurality of antennas disposed on a lower surface of an exterior of the aircraft. The plurality of antennas may be disposed to provide a target antenna gain over a range of aircraft orientations with respect to a ground antenna of an associated ground facility of a terrestrial communications system. The first equipment may include a first radio. The first radio may include the first modem coupled to the controller, a first transceiver coupled to the first modem, and a first antenna coupled to the first transceiver. The first transceiver is configured to further process the signals communicated with the non-terrestrial relay point. The second transceiver is configured to further process signals communicated with the terrestrial relay point. The first equipment may include a second radio. The second radio may include the second modem coupled to the controller, a second transceiver coupled to the second modem, and a first antenna coupled to the second transceiver. The apparatus may include an in-flight entertainment system configured to communicate with seat display terminals of the aircraft. The controller may be configured to update the in-flight entertainment system with the information. The small cell access node may be compliant with at least one of 3G, LTE, LTE-Advanced, or other suitable wireless communications standards and may communicate signals using licensed or unlicensed spectrum.

In at least one embodiment, a method for operating a communications system on an aircraft comprises communicating first data streams between a controller and first equipment on the aircraft using a first wireless protocol and first power spectral density mask. The method includes communicating second data streams between the controller and second equipment on the aircraft using a second wireless protocol and second power spectral density. The method includes communicating the first data streams between the controller and third equipment. The third equipment includes a first modem and a second modem. The first modem is configured to process signals communicated with a non-terrestrial relay point and the second modem is configured to process signals communicated with a terrestrial relay point. The method includes communicating the second data streams between the controller and the third equipment. The method may include communicating a third data stream between avionics equipment and the controller and communicating the third data stream between the controller and at least one of the first modem and the second modem. The method may include communicating a fourth data stream between display terminals of an in flight-entertainment system of the aircraft and the controller. The method may include communicating at least one of the first, second, third, and fourth data streams with ground equipment external to the aircraft. The method may include allocating aircraft-area bandwidth to communications sessions corresponding to the first, second, third, and fourth data streams between equipment on the aircraft and the controller according to the prioritization level of the equipment on the aircraft, the prioritization level being selected from a plurality of prioritization levels based on a type of the equipment on the aircraft, the plurality of prioritization levels including a prioritization level of aircraft passenger user equipment, a prioritization level of avionics equipment, a prioritization level of an in-flight entertainment system, and a prioritization level of aircraft personnel communications equipment. The method may include communicating signals of the communications session using the aircraft-area bandwidth allocation.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
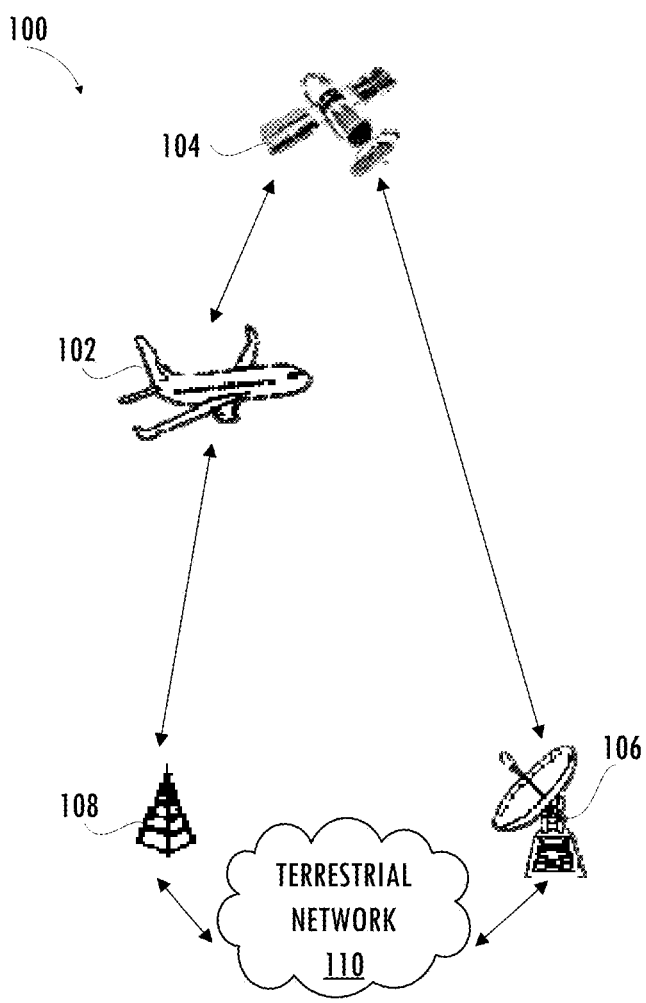
FIG. 1 illustrates a functional diagram of an exemplary in-flight communications system.

Referring to FIG. 1, in-flight communications network 100 uses air-to-ground communications and satellite communications to provide in-flight wide area access to users on aircraft 102. An exemplary air-to-ground system includes a terrestrial relay point (e.g., an up-tilted antenna coupled to an eNodeB, base transceiver station, or other communications system coupled to a network) that directly communicates with wireless handsets or other user equipment, scattered across a service area. When using satellite communications, aircraft 102 communicates with a non-terrestrial relay (e.g., satellite 104), which communicates signals to terrestrial network 110 via satellite band signal receiver 106 and associated equipment. Exemplary satellite band signals use a portion of the electromagnetic spectrum allocated to satellite communications, including signals operating in the Super High Frequency (SHF) band (e.g., 3 to 30 GHz), C band (e.g., 4 GHz to 8 GHz), G band (e.g., NATO G band of 4 GHz to 6 GHz, IEEE G band of 110 GHz to 300 GHz, or obsolete G band 140 MHz to 220 MHz), H Band (e.g., 6 GHz to 8 GHz), Ku band (e.g., 12 GHz to 18 GHz), Ka band (e.g., 26.5 GHz to 40 GHz), L band (e.g., 40 GHz to 60 GHz or 1 GHz to 2 GHz), X band (e.g., 7 GHz to 12 GHz), and F band (e.g., 3 GHz to 4 GHz), or other portions of the electromagnetic spectrum suitable for long-distance radio telecommunications. When using air-to-ground communications, aircraft 102 communicates with cell tower 108, which communicates signals to terrestrial network 110. Exemplary air-to-ground signals use sets of frequency ranges within the ultra high frequency band allocated for cellular phone use (e.g., 800 MHz).

Figure 2:
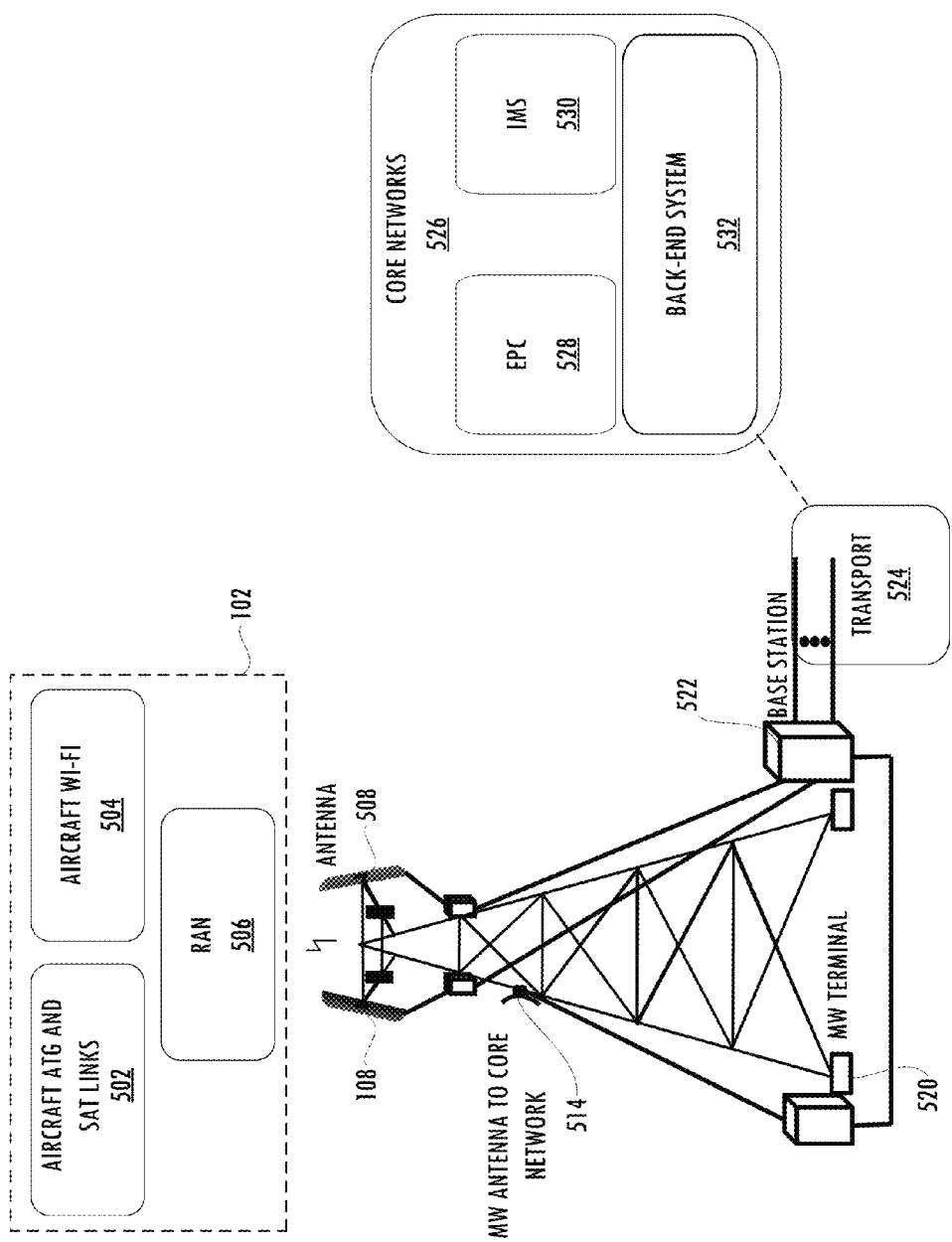
FIG. 2 illustrates a functional block diagram of network elements of the in-flight communications network of FIG. 1.

Referring to FIG. 2, in at least one embodiment, in addition to the aircraft air-to-ground communications links and the satellite communications links 502, the in-flight communications network includes in-cabin local area network (e.g., aircraft WiFi 504) equipment, a radio access network 506, which is coupled to core network 526 and a back end system 532, e.g., using antenna 508, microwave antenna 514, microwave terminal 520, base station 522, and terrestrial transport network 524. Core network 526 includes one or more of Evolved Packet Core (EPC) 528 (e.g., the core network of the Long Term Evolution (LTE) system of the 3GPP core network architecture, also known as System Architecture Evolution (SAE) core, which is an All Internet Protocol Network (AIPN)), Internet Protocol (IP) Multimedia Subsystem (IMS) network 530, or other suitable core network. Back-end system 532 provides policy, billing and support systems. The in-flight communications network includes one or more of the following services: advanced Mi-Fi puck, Internet, video, video calling, and voice/text (e.g. short message service (SMS) or voice calls to native applications or number). The in-flight communications network includes a wireless router that serves as a mobile WiFi hotspot, e.g., connects to core network 526 and provides Internet access for multiple devices on the aircraft. In addition, the in-flight communications network is compatible to various regional services (e.g., United States and European Union).

Figure 3:
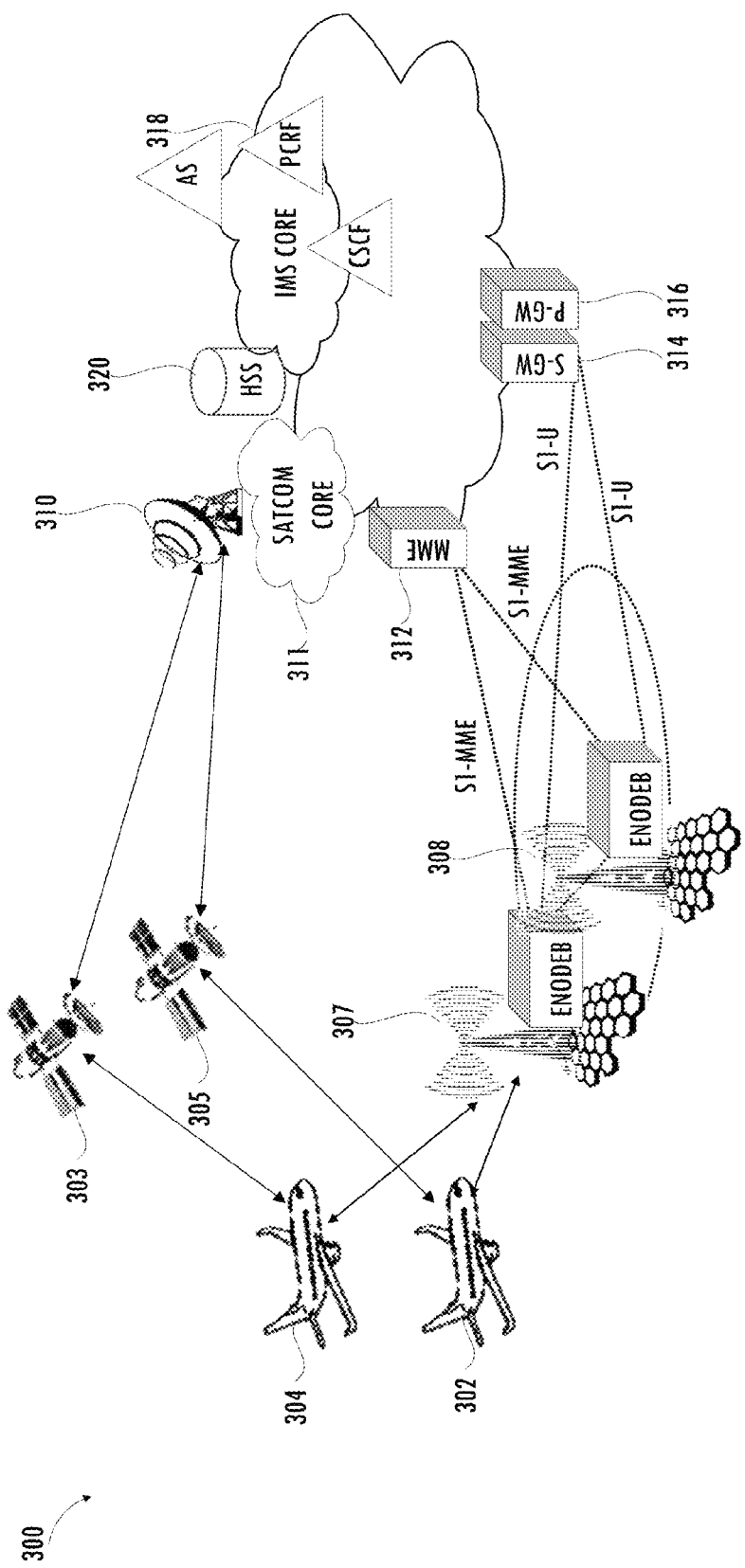
FIG. 3 illustrates a functional block diagram of network architecture of an exemplary in-flight communications network.

Referring to FIG. 3, exemplary in-flight communications network 300 uses an air-to-ground communications network separate from a satellite communications network and includes an evolved packet core network including mobility management entity 312, serving gateway 314, packet data network gateway 316, and policy and charging rules function (PCRF) 318. Mobility management entity 312 performs signaling and control functions to manage access to network connections by users on aircraft 302 and aircraft 304, assignment of network resources to aircraft 302 and aircraft 304, and mobility management functions, e.g., idle mode location tracking, paging, roaming, and handovers. Mobility management entity 312 controls all control plane functions related to subscriber and session management for air-to-ground service to users on aircraft 302 and aircraft 304. In addition, mobility management entity 312 provides security operations including providing temporary identities for user terminals, interacting with home subscriber server 320 for authentication, and negotiation of ciphering and integrity protection algorithms.

As referred to herein, a session is an active communication of data over a network between two devices and may include a first data stream from a first device to the second device and a second data stream from the second device to the first device. It may be possible to have more than one session between two devices simultaneously. Mobility management entity 312 selects suitable serving and Packet Data Network (PDN) gateways, and selects legacy gateways for handover to other networks. Mobility management entity 312 manages a plurality (e.g., thousands) of eNodeB elements or evolved packet data gateway elements. Serving gateway 314 manages user plane mobility. Serving gateway 314 routes and forwards user data packets. Serving gateway 314 also behaves as a mobility anchor during inter-eNodeB handovers and as the anchor for mobility between LTE and other 3GPP technologies. Packet data network gateway 316 provides connectivity from user equipment on aircraft 302 and aircraft 304 to external packet data networks by being the point of exit and entry of traffic for the user equipment. Policy and charging rules function 318 interfaces with packet data network gateway 316 and supports service data flow detection, policy enforcement, and flow-based charging. Home subscriber server 320 is a central database that stores user-related and subscription-related information. Home subscriber server 320 provides mobility management, call and session establishment support, user authentication, and access authorization.

Figure 4:
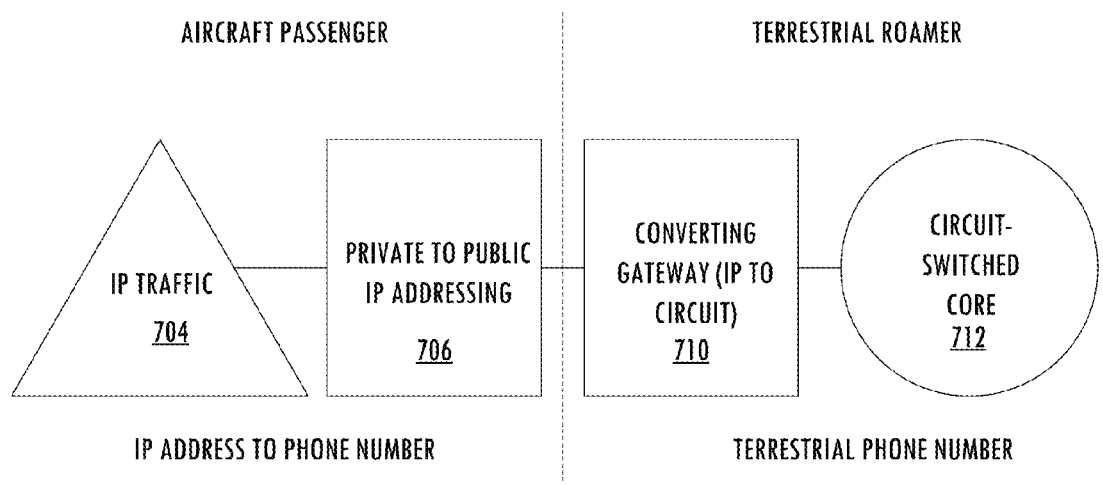
FIG. 4 illustrates a functional block diagram of resources for communicating calls and texts using the exemplary in-flight communications network of FIG. 3.

Referring to FIG. 4, implementation of WiFi calling and texting on the aircraft facilitates video or voice calls and texting from users in flight to terrestrial users. On the aircraft, an interim layer 706 converts a private IP address of the user on the aircraft to a public IP addressing scheme. For example, interim layer 706 may map multiple users on one aircraft to a single IP address for the aircraft. In the core implementation, gateway 710 assigns a dedicated communications channel or circuit to the IP address allows the user on the aircraft to communicate using Voice over Internet Protocol (VoIP) or to communicate to an endpoint having a terrestrial phone number through circuit-switched core 712.

Referring back to FIG. 3, aircraft 302 and aircraft 304 may separately communicate with non-terrestrial relay points (e.g., satellites 303 and 305), which communicate with satellite core 311 and an IP multimedia subsystem to provide services to users. Although the non-terrestrial relay point is described herein as being a satellite relay point (e.g., stationary or geostationary satellite), other embodiments of the non-terrestrial relay point include low duration aircraft, long duration aircraft (e.g., high-altitude platform aircraft (HAPS) or similar system), aerostat, or other non-terrestrial relay point. Traffic from the non-terrestrial relay point is delivered to an appropriate terrestrial termination point or directly to another aircraft, thus allowing a user-to-user communication or aircraft-to-aircraft communication. Note that the satellite communications system and the air-to-ground communications system operate independently and a particular aircraft may utilize one, the other, or both at a particular time.

Figure 5:
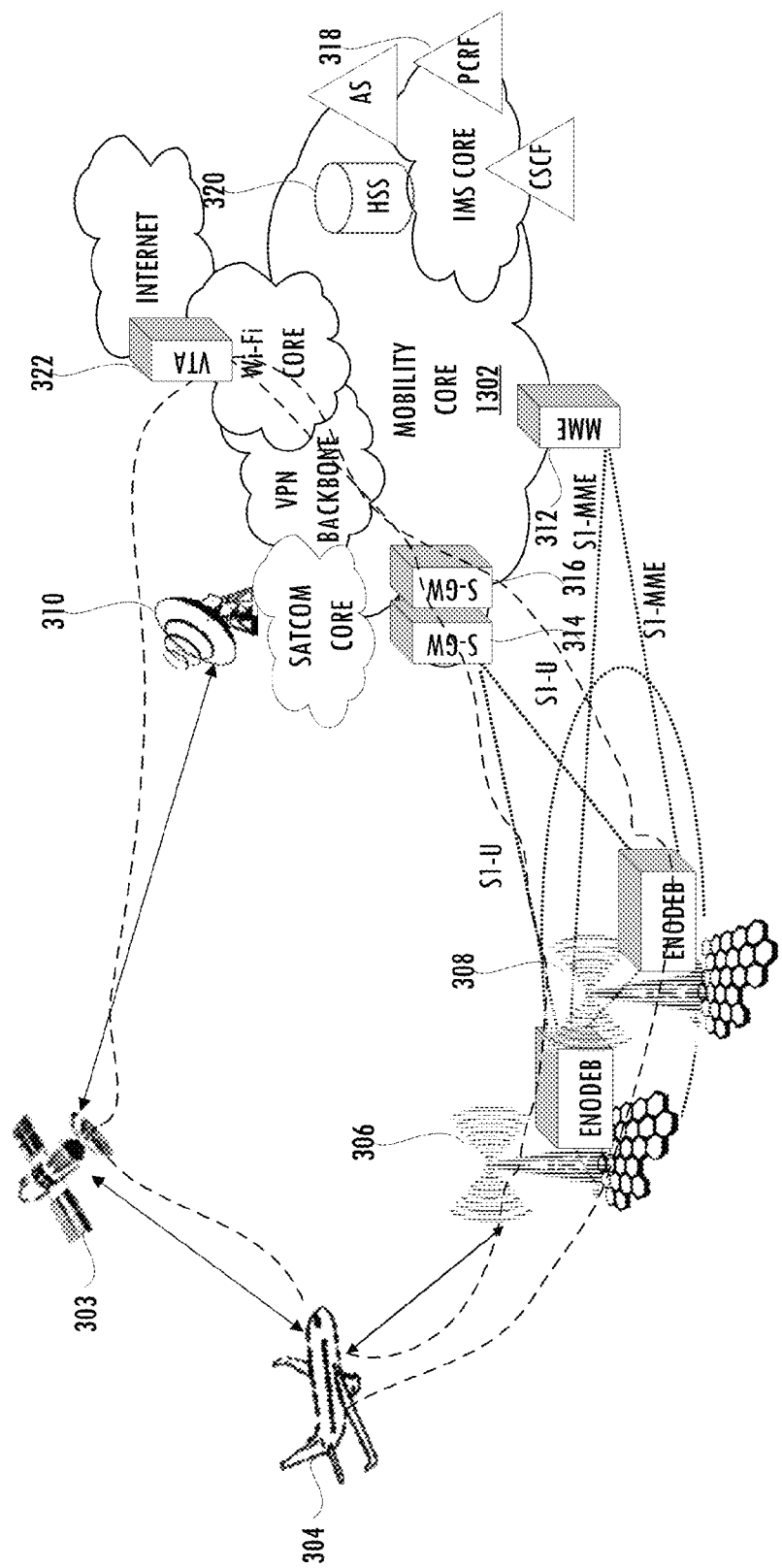
FIG. 5 illustrates a functional block diagram of an exemplary in-flight communications network.

Referring to FIG. 5, a hybrid in-flight communications system integrates aircraft communications systems and traffic management of the aircraft air-to-ground communications and satellite communications to provide gate-to-gate connectivity to users on an aircraft. Virtual tunnel aggregator 322 establishes individual communications sessions using generic routing encapsulated (GRE) tunnel communications between the user on aircraft 304 using either the satellite communications system core or mobility core 1302. As referred to herein, a user on an aircraft includes passengers, airline personnel, an in-flight entertainment system, and the avionics system. Virtual tunnel aggregator 322 may include one or more general-purpose processors and corresponding locations storing software or firmware instructions configured to execute on the one or more general purpose processors, and/or one or more application-specific integrated circuits configured to accomplish tasks set forth herein.

Figure 6:
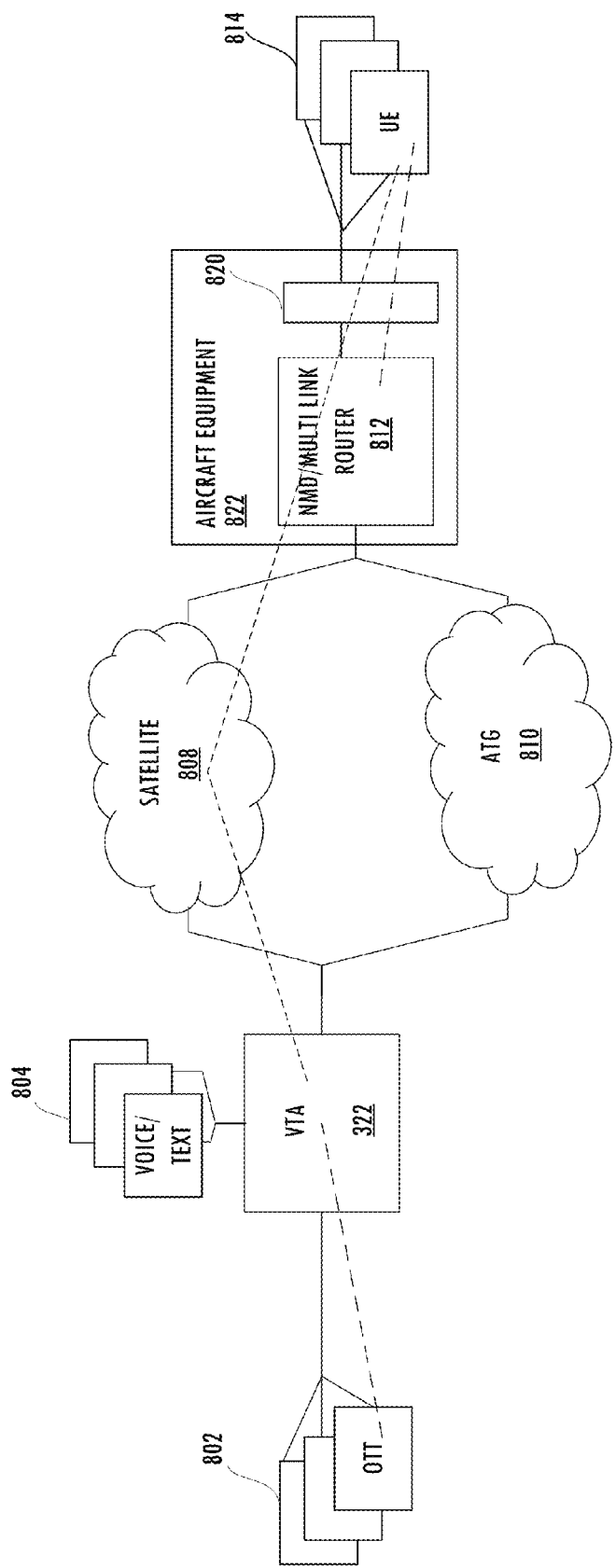
FIG. 6 illustrates a functional block diagram of an exemplary in-flight communications network configured for traffic classification based balancing.

Referring to FIGS. 5 and 6, a session between user equipment 814 on aircraft 304 and a device coupled to mobility core 1302 may be established using virtual tunnel aggregator 322, and a voice or text communications network 804 or an over-the-top (OTT) server 802, i.e., a server that delivers audio, video, or other media over the Internet without a multiple-system operator (i.e., multi-system operation, e.g., cable operator) being involved in the control or distribution of the content. Data may be communicated between voice or text communications device 804 and user equipment 814 using aircraft equipment 822, which includes network module/multi-link router 812 and aircraft access point 820, and only one of satellite system 808 and air-to-ground system 810. Aircraft access point 820 may be a small cell, a wireless access point, an in-flight entertainment system, or other user or user equipment interface that coupled to the in-flight network. Virtual tunnel aggregator 322 and the network module/multi-link router 812 establish a session based on traffic classification. High-latency intolerant sessions may be allocated air-to-ground bandwidth while high-latency tolerant traffic is allocated to the satellite communications system.

Figure 7:
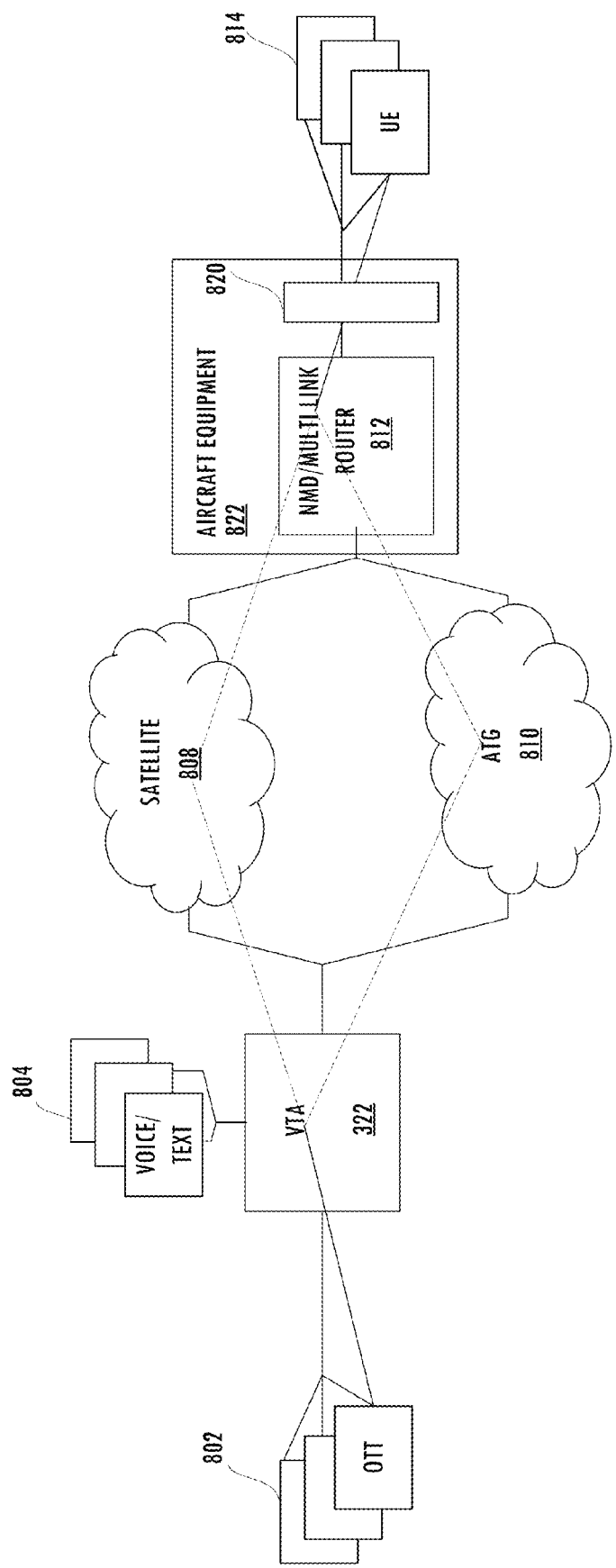
FIG. 7 illustrates a functional block diagram of an exemplary in-flight communications network configured to partition traffic based on network layer information.

Referring to FIGS. 5 and 7, data may be communicated between OTT server 802 and user equipment 814 on an aircraft using virtual tunnel aggregator 322 and both satellite communications system 808 and an air-to-ground system 810 via aircraft equipment 822, which includes network module/multi-link router 812 and aircraft access point 820. Virtual tunnel aggregator 322 and network module/multi-link router 812 implement a network layer (i.e., layer 3 of the seven-layer Open Systems Interconnection (OSI) model of computer networking) solution that partitions the data traffic into a portion communicated over satellite communications system 808 and a portion communicated over the air-to-ground system 810 based on layer 3 information (e.g., link state and available bandwidth). However, this layer 3 solution TCP may have poor performance if packets arrive out-of-order and some applications may behave poorly under high jitter.

Figure 8:
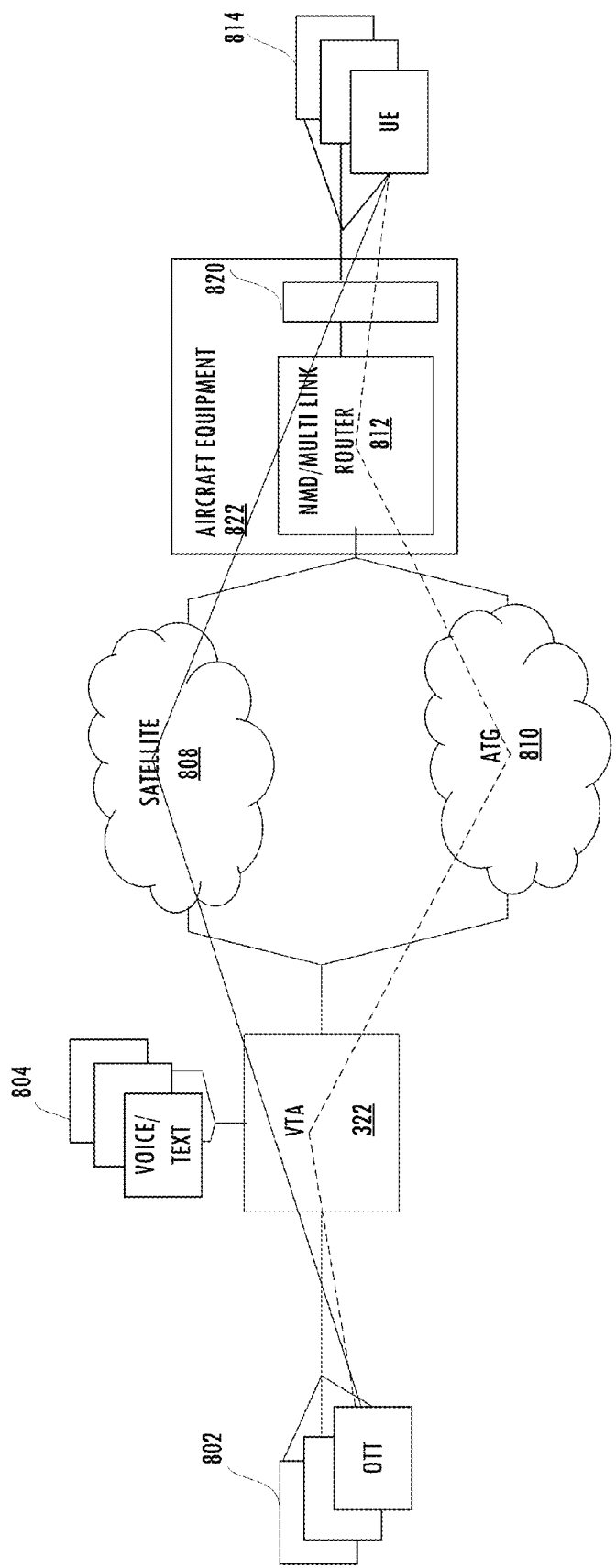
FIG. 8 illustrates a functional block diagram of an exemplary in-flight communications network configured to split traffic based on network layer information and bundle on an exemplary transmission control protocol (TCP) connection on one link.
Figure 9:
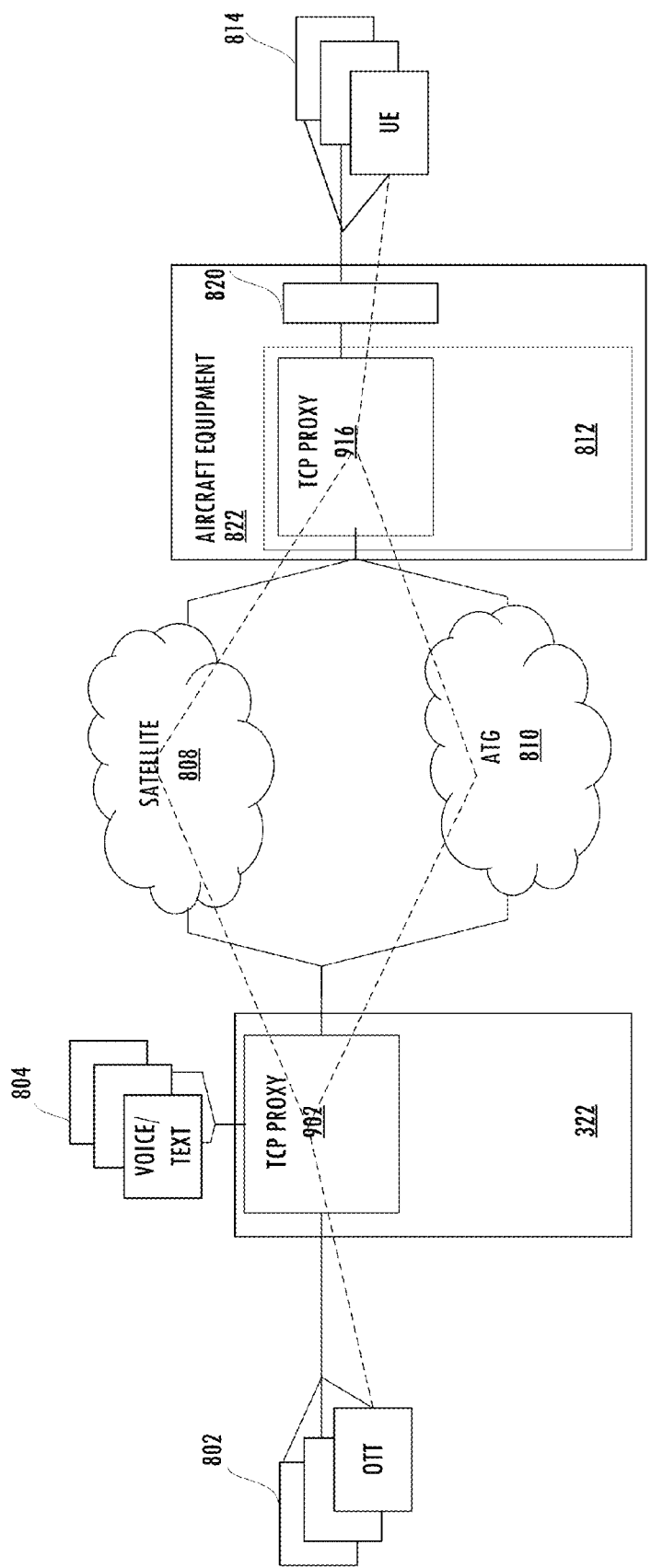
FIG. 9 illustrates a functional block diagram of an exemplary aircraft communications system from FIG. 5 configured to use multipath TCP on air-to-ground link.

Referring to FIGS. 5 and 8, in another configuration of an in-flight communications system a transport layer (i.e., layer 4 of the seven-layer OSI model) solution partitions the data traffic into a portion communicated over satellite communications system 808 and a portion communicated over the air-to-ground system 810 based on layer 3 information (e.g., link state and available bandwidth) but also bundles all traffic of one TCP connection on one link. Referring to FIGS. 5 and 9, in another embodiment, a TCP proxy (e.g., TCP proxy 902 or TCP proxy 916) partitions the data traffic into a portion communicated over satellite communications system 808 and a portion communicated over the air-to-ground system 810 to another TCP proxy of virtual tunnel aggregator 322 and a multipath TCP connection that includes multiple paths.

Figure 10:
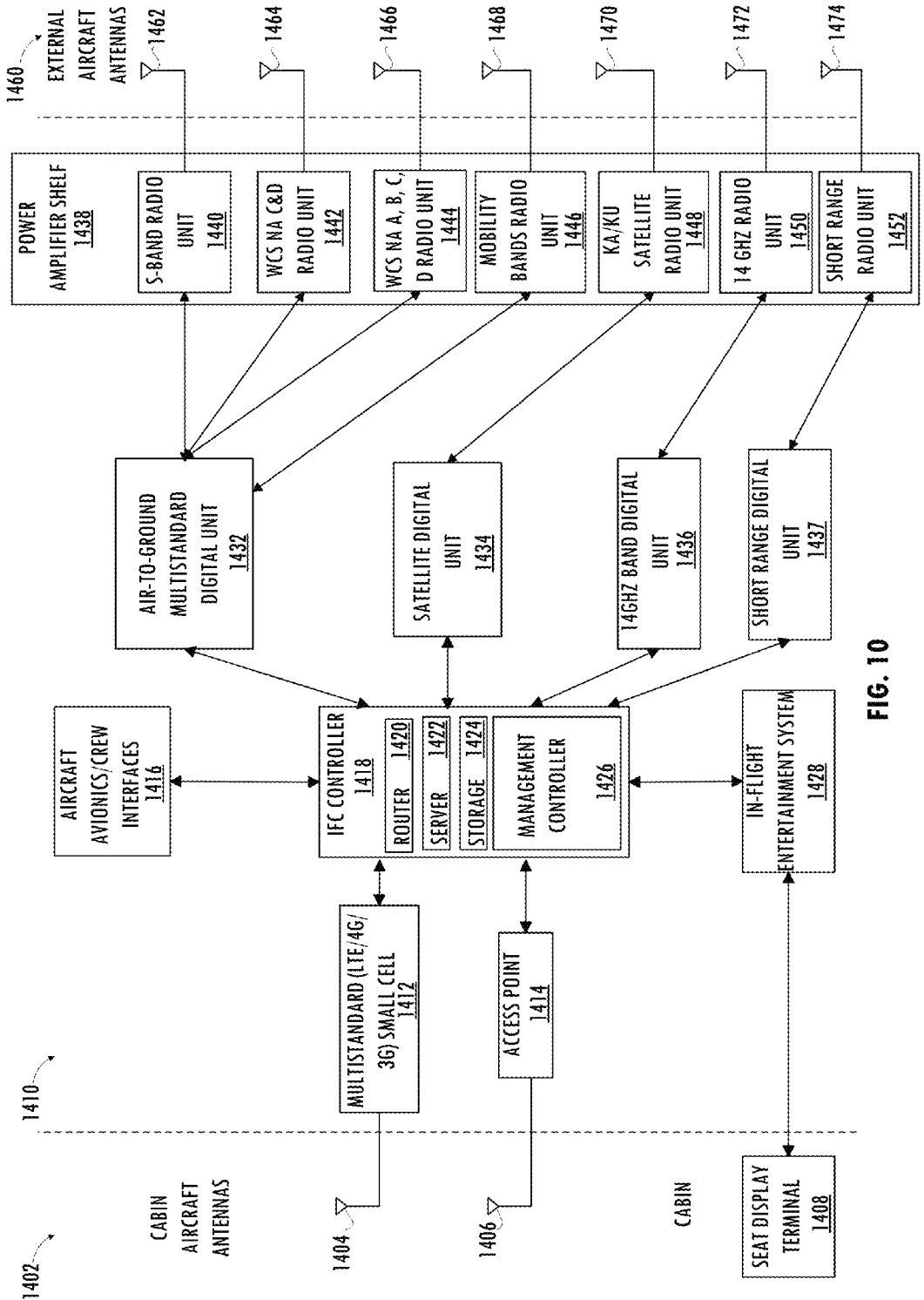
FIG. 10 illustrates a functional block diagram of aircraft equipment architecture for the exemplary in-flight communications network of FIG. 5.

FIG. 10 illustrates exemplary in-flight connectivity equipment included in aircraft equipment 822 of FIGS. 5-9 that can provide simultaneous and coordinated communications services over air-to-ground and satellite communications systems. Note that as referred to herein, equipment on the aircraft includes equipment that is attached externally to any surface of the aircraft, equipment that is inside the aircraft, and/or equipment that is otherwise part of the aircraft. In-flight connectivity on-board equipment includes cabin equipment 1402, aircraft system equipment 1410, and external aircraft antennas 1460. Users on the aircraft may communicate in-flight using a communications device (e.g., smartphone, laptop, tablet, gaming system, seatback display, wearable device, machine-to-machine (M2M) module, or other suitable equipment used by an end-user to communicate) that may be coupled to aircraft equipment 822 (e.g., a communications terminal in a seatback or armrest) by a transmission line or by a wireless interface configured to communicate using a wireless networking technology (e.g., Bluetooth, IEEE 802.11 wireless local area network technologies, Long-Term Evolution (LTE), second-Generation (2G), third-Generation (3G), fourth-generation (4G), LTE-Advanced, LTE in unlicensed spectrum (LTE-U), Global System for Mobile Communications (GSM), Enhanced Data rates for GSM Evolution (EDGE), High Speed Packet Access (HSPA), Universal Mobile Telecommunications System (UMTS), and Worldwide Interoperability for Microwave Access (WiMax) wireless communications, or other wireless communications protocols, which use one or more of Code Division Multiple access (CDMA), Time Division Multiple Access (TDMA), Frequency Division Multiple Access (FDMA), Wideband CDMA (WCDMA), Orthogonal Frequency Division Multiple Access (OFDMA), or other suitable communications techniques). The wireless interface includes one or more antennas. For example, the aircraft cabin may include antenna 1404 coupled to a radio access node compliant with a wide-area network standard, antenna 1406 coupled to a WiFi radio access point 1414, or other antenna (e.g., an antenna in seat display terminal 1408 coupled to receive signals over a short range). Note that individual antennas may provide wireless service within the aircraft using distributed antenna system including a network of spatially separated antenna nodes coupled to an access point via a transport medium.

In at least one embodiment, aircraft system equipment 1410 includes small cell 1412, which is a low-powered radio access node that operates in a predetermined spectrum (licensed or unlicensed spectrum) on the aircraft. Small cell 1412 may be compliant with LTE, 2G, 3G, 4G, LTE-Advanced, LTE-U, GSM, EDGE, HSPA, UMTS, and WiMax wireless communications, or other wireless protocol typically used for wide-area networking that uses one or more of CDMA, TDMA, FDMA, WCDMA, OFDMA, or other suitable communications techniques. Small cell 1412 facilitates use of personal equipment of passengers being used, unchanged, on the aircraft, and reduces the need for additional handsets to be provided on the aircraft by an aircraft operator. Additional small cells (not shown) and corresponding antennas may be included to facilitate use of personal equipment compatible with various different wide-area networking standards and/or small cell 1412 may be compliant with multiple standards. Aircraft system equipment 1410 may also include access point 1414 that is compliant with a local area network protocol (e.g., WiFi) and that serves as an aircraft hotspot to user personal equipment configured compliant with such communications standards. Access point 1414 facilitates use of user personal equipment over regular communications spectrum on the aircraft and reduces the need for additional handsets to be provided by the aircraft operator. Additional access points and corresponding antennas may be included to facilitate use of personal equipment compatible with various different local-area networking standards.

In at least one embodiment, aircraft system equipment 1410 includes seat display terminals in the seat-backs or other suitable portion of the aircraft cabin. Each seat display terminal 1408 is coupled to in-flight entertainment system 1428, which may provide various types of programming to users including one or more of interactive direct-broadcast satellite television, Internet, and audio programming, without requiring use of a user's own personal user equipment. In addition, user equipment may directly connect to the in-flight entertainment system using a port in a seat display terminal or other portion of the aircraft cabin. Aircraft system equipment 1410 may also include interface 1416, which includes one or more interface for avionics and crew. Interface 1416 may communicate with one or more of the electronic systems used on the aircraft, including communications, navigation, global positioning systems, and/or other electronic systems of the aircraft to an aircraft operator, air traffic control, or other recipient (e.g., nearest local or government authorities). Avionics and crew interface 1416 may also provide crew with configuration and override access to other services being provided by aircraft system equipment 1410. For example, the crew may manually disable and/or configure small cell 1412, access point 1414, in-flight entertainment system 1428, modems (e.g., digital units 1432, 1434, 1436, and 1437) and/or components of power amplifier shelf 1438 for the entire aircraft and/or for individual user access. Avionics and crew interface 1416 may also provide a communications interface for crew to the aircraft operator, air traffic control, or other recipients (e.g., nearest local or government authorities).

Still referring to FIG. 10, aircraft system equipment 1410 includes in-flight connectivity controller 1418. The control functions may be performed by a stand-alone controller or distributed across multiple computers, microprocessors, or other suitable devices. In-flight connectivity controller 1418 includes router 1420, server 1422, storage 1424 and may include an additional management functions control unit 1426. Each of the elements of in-flight connectivity controller 1418 may include one or more general-purpose processors and corresponding locations in storage facility 1424 storing software or firmware instructions configured to execute on the one or more general purpose processors, and/or one or more application-specific integrated circuits configured to accomplish tasks set forth herein. In addition, storage facility 1424 may include data associated with operation of in-flight connectivity controller 1418, e.g., routing information and other in-flight connectivity system configuration information. Router 1420 forwards data packets between the aircraft communications systems (e.g., avionics and crew interface 1416, small cell 1412, access point 1414, and in-flight entertainment system 1428) and transceivers for communications external to the aircraft. Note that access points 1412, 1414, and other wireless access points may communicate with user equipment using different power levels, different frequencies, different channels, different power spectral density masks, and/or different communications protocols. Management controller 1426 establishes routing encapsulation tunnels (e.g., generic routing encapsulation tunnels) between the users of the in-flight connectivity services and services provided by terrestrial communications systems.

In general, router 1420 receives and assembles or disassembles packets before forwarding them on to an internal or external network, respectively. In addition, management controller 1426 may perform registration of user equipment on the aircraft to the in-flight communications network, encryption, e.g., secure shell encryption, transport layer security, or secure sockets layer encryption, and Doppler shift compensation based on signal frequency and velocity of the aircraft received from the avionics. In other embodiments, the Doppler shift compensation is performed by digital units 1432, 1434, 1436, and 1437 based on information received from the avionic directly or indirectly via in-flight connectivity controller 1418. In addition, in-flight connectivity controller 1418 allocates aircraft-area bandwidth (e.g., bandwidth for communications using the in-flight communications network in regions internal or proximate to the aircraft including the aircraft cabin, the aircraft cockpit, cargo area, and other regions internal or proximate to the aircraft within range of signals transmitted using cabin equipment 1402) to individual sessions on the airplane (i.e., between a user and management controller 1426) according to the prioritization level of equipment on the aircraft. The prioritization level may be based on a type of the equipment on the aircraft. The prioritization levels may include a prioritization level of aircraft passenger user equipment, a prioritization level of avionics equipment, a prioritization level of an in-flight entertainment system, and a prioritization level of aircraft personnel communications equipment.

In at least one embodiment, aircraft system equipment 1410 includes air-to-ground digital unit 1432, satellite digital unit 1434, and additional satellite digital unit 1436, which perform modulation and demodulation of signals communicated between in-flight connectivity controller 1418 and relay points external to the aircraft (e.g., a terrestrial relay point or a non-terrestrial relay point). Air-to-ground digital unit 1432 may be compliant with one or more wide-area network standards (e.g., LTE, 2G, 3G, 4G, LTE-Advanced, LTE-U, GSM, EDGE, HSPA, UMTS, and WiMax wireless communications, or other wireless protocol typically used for wide-area networking that uses one or more of CDMA, TDMA, FDMA, WCDMA, OFDMA, or other suitable communications techniques). Satellite digital unit 1434 may be compliant with one or more of Super High Frequency (SHF) band (e.g., 3 to 30 GHz), C band (e.g., 4 GHz to 8 GHz), G band (e.g., NATO G band of 4 GHz to 6 GHz, IEEE G band of 110 GHz to 300 GHz, or obsolete G band 140 MHz to 220 MHz), H Band (e.g., 6 GHz to 8 GHz), Ku band (e.g., 12 GHz to 18 GHz), Ka band (e.g., 26.5 GHz to 40 GHz), L band (e.g., 40 GHz to 60 GHz or 1 GHz to 2 GHz), X band (e.g., 7 GHz to 12 GHz), and F band (e.g., 3 GHz to 4 GHz), frequency band mobility network communications. Additional digital unit 1436 includes transmitter and receiver digital circuitry for other frequency bands (e.g., 14 GHz frequency band or other frequency bands that are separately regulated). Air-to-ground digital unit 1432, satellite digital unit 1434, and additional digital unit 1436 include circuits that implement digital signal transmitter operations and digital signal receiver operations.

Power amplifier shelf 1438 includes radio units that correspond to the standards implemented by the various digital units. Each of radio units 1440, 1442, 1444, . . . , 1452 includes circuits (e.g., transceivers) that perform analog transmitter and analog receiver operations for signals communicated to and from one or more corresponding antennas 1462, 1464, 1466, . . . , 1474. Exemplary operations include digital-to-analog conversion, analog modulation, mixing with a carrier signal, power amplification, sampling, analog demodulation, filtering, applying a power-spectral density mask, and/or other suitable radio frequency communication operations. Note that the receivers may process multiple signals from Multiple-Input Multiple-Output (MIMO) embodiments or multiple signals received over multiple antennas using diversity combining or other diversity techniques. An individual antenna may be shared by multiple radio bands or a multi-band antenna, antenna switch, combiner or other suitable technique may be used. Radio units 1440, 1442, 1444, and 1446 perform those transmit and receiver operations for the frequency bands that correspond to the different air-to-ground standards, e.g., S frequency band, C and D blocks of the WCS frequency band, A, B, C, and D blocks of the WCS frequency band, and mobility frequency bands, respectively using corresponding antennas on the aircraft (antennas 1462, 1464, 1466, and 1468, respectively). Note that in one embodiment of air-to-ground communications system, the C and D frequency bands are used as primary frequency bands and additional bands (e.g., A and B frequency bands) are used for communications with a Remote Radio Head (RRH) of the distributed base station. Similarly, radio unit 1448 performs transmit and receive operations for communications between antenna 1470 and satellite digital unit 1434 and the 14 GHz radio unit 1450 performs transmit and receive operations for communications between antenna 1472 and air-to-ground digital unit 1436.

In at least one embodiment, aircraft system equipment 1410 includes short range wireless digital unit 1437 and short-range wireless radio unit 1452 coupled to antenna 1474. Those elements facilitate communications and updates of the in-flight entertainment system using short-range wireless communications (e.g., WiFi), without requiring separate equipment. In addition, those elements may be used to provide communications services to users while an aircraft is on the ground (e.g., parked at a gate) using a terrestrial WiFi system coupled to the Internet. Additional digital units, radio units, and antennas may be included to provide other coverage, e.g., to provide regular terrestrial communications to a terrestrial wireless communications system. In embodiments of an in-flight connectivity system, additional eNodeBs are located close to or on airport property to facilitate communications from the aircraft while parked at an airport gate. In at least one embodiment of the in-flight connectivity system, multiple frequency bands share the same antenna or a multi-band antenna, antenna switch, combiner or other suitable technique may be used. In addition, note that although only one antenna is illustrated per frequency band, multiple antennas may be used for each frequency band, each antenna being strategically located on the fuselage to provide more continuous communications coverage based on the aircraft orientation with respect to a terrestrial antenna. For example, the antennas may have different angles with respect to a terrestrial antenna to increase coverage during aircraft banking. Cabin equipment 1402, aircraft system equipment 1410, and external aircraft antennas 1460 facilitate multiple streams of data being communicated to/from users of an aircraft (e.g., seat display terminal 1408, user equipment using small cell 1412, user equipment using access point 1414, and aircraft avionics and crew interface 1416) and virtual tunnel aggregator 322 using air-to-ground and satellite communications systems. In at least one embodiment, aircraft antennas are implemented using multi-band antennas.

Figure 12:
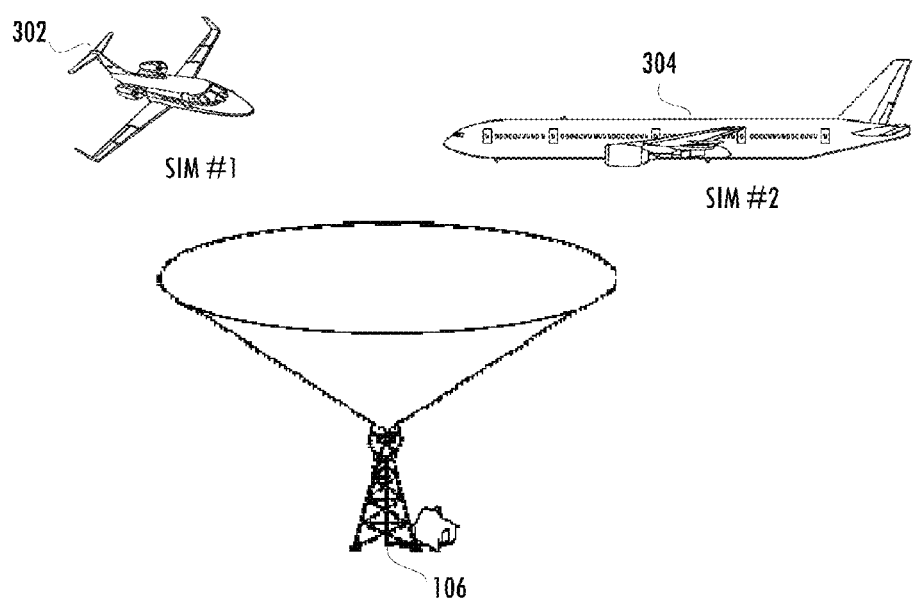
FIG. 12 illustrates an exemplary in-flight communications network implementing aircraft-specific resource allocation.

Referring to FIG. 12, management controller 1426 establishes routing encapsulation tunnels (e.g., generic routing encapsulation tunnels) between the users of the in-flight connectivity services and virtual tunnel aggregator 322 of FIG. 5. In response to a registration operation of aircraft 302 using an aircraft identity stored in storage 1424, virtual tunnel aggregator 322 allocates bandwidth to upstream and/or downstream communications with aircraft 304. That bandwidth allocation may be partitioned between the air-to-ground system, the satellite communications system, and/or other communications system based on a link budget, aircraft identity type, traffic characteristics, a subscription profile for the aircraft, or other suitable aircraft status and location.

Figure 11:
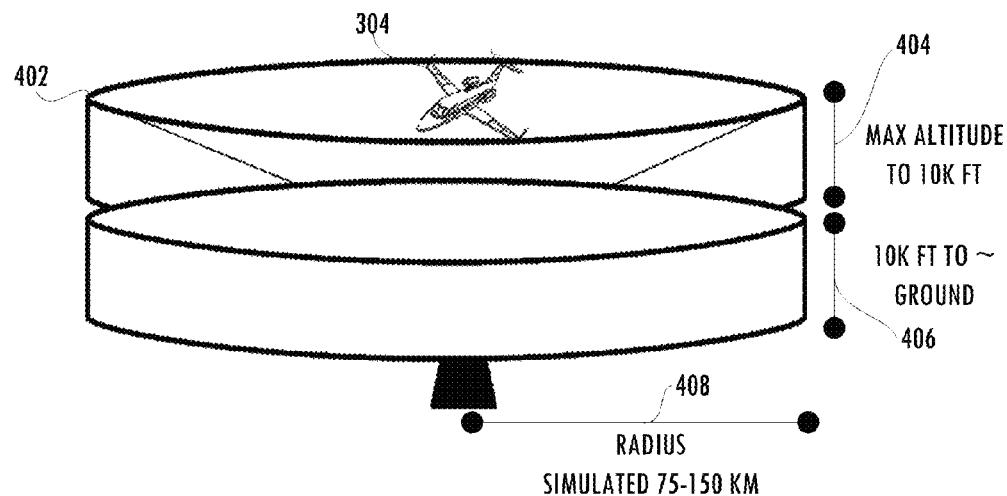
FIG. 11 illustrates a diagram of an exemplary in-flight communications network representation of a link budget based on aircraft altitude.

Referring to FIG. 11, a link budget for aircraft 304 accounts for all of the gains (e.g., due to antenna diversity and frequency hopping schemes) and losses from the transmitter and the receiver through the atmosphere. The link budget accounts for attenuation of transmitted signals due to propagation, as well as antenna gains, feedline, and miscellaneous losses. Since losses due to the atmosphere vary with altitude, the link budget may be estimated based on a single sector view of a particular radius of the position of the aircraft with respect to the cell tower (e.g., center point to 75 kilometers from the cell tower), using a maximum altitude, although the losses may be reduced for aircraft flying at lower altitudes. In at least one embodiment, a communications network bases the aircraft link budget on multiple predetermined sectors (e.g., maximum altitude to approximately 10,000 feet and approximately 10,000 feet to approximately ground). In addition, the link budget accounts for gain due to the number of antennas used, e.g., a multiplication factor for 2×2 multiple-input, multiple output (MIMO).

In at least one embodiment of the in-flight connectivity network, a communications system (e.g., the air-to-ground communications system or the satellite communications system) allocates bandwidth to a particular aircraft according to aircraft type. For example, each aircraft includes a subscriber identity module that indicates the aircraft type, e.g., a commercial jet having capacity for n passengers, a private jet having capacity for m passengers, a military aircraft, a drone aircraft, or other type of aircraft. Mobility management entity 312 of FIG. 5 may allocate bandwidth to a particular aircraft by prioritizing an aircraft with a greater number of actual passengers (e.g., aircraft 304 of FIG. 12) over a smaller aircraft transporting fewer passengers (e.g., aircraft 302 of FIG. 12). Other prioritization schemes may be used, e.g., prioritization based on subscription services of one or more aircraft operators associated with individual aircraft, or other suitable schemes.

Once an aircraft is allocated bandwidth of a particular communications system, in-flight connectivity controller 1418 of FIG. 10 allocates that bandwidth to user equipment associated with individual users on the aircraft. As referred to herein, a user is one of a passenger, a crew member, the aircraft avionics system, or the in-flight entertainment system. Each user and/or user type may be granted different priority for its associated equipment. For example, aircraft avionics may be granted highest priority and equipment associated with passengers may be granted lowest priority. In at least one embodiment, in-flight connectivity controller 1418 prioritizes use of any air-to-ground bandwidth allocated to the aircraft over satellite system bandwidth due to lower latency characteristic and/or lower cost of the air-to-ground communications as compared to the latency and cost of satellite communications. That is, in-flight connectivity controller 1418 may allocate all of the air-to-ground communications bandwidth before allocating any satellite communications bandwidth or partitions bandwidth amongst different users (e.g., allocates satellite communications bandwidth to the in-flight entertainment system and then to other users).

Figure 13:
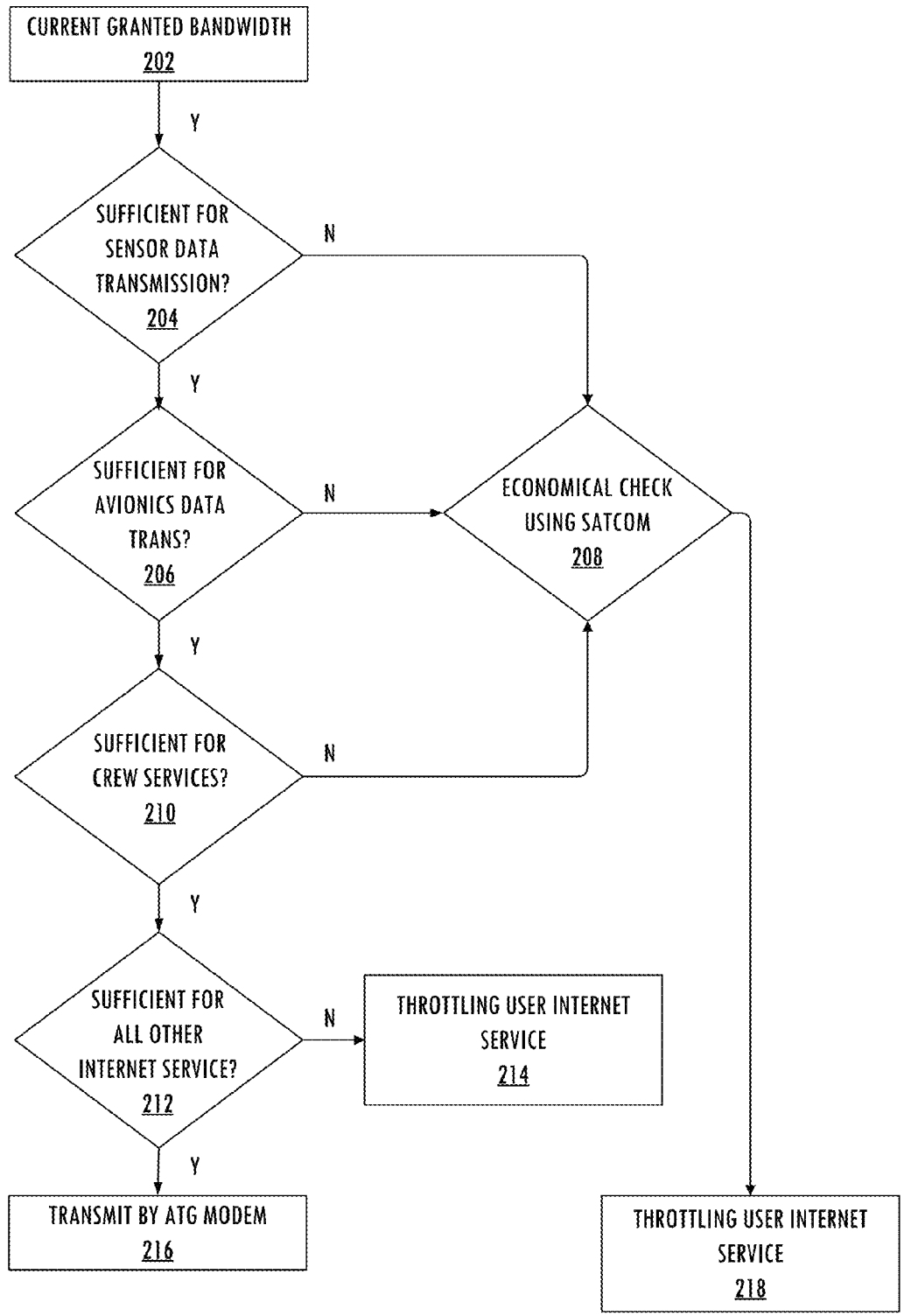
FIG. 13 illustrates exemplary information and control flows for radio resource management in an exemplary in-flight communications system.

Referring to FIG. 13, air-to-ground communications system and a satellite communications system grant bandwidth to in-flight connectivity controller 1418 (202) and in-flight connectivity controller 1418 prioritizes the air-to-ground bandwidth. For example, in-flight connectivity controller 1418 determines whether sufficient air-to-ground system bandwidth is available for sensor data transmission from the aircraft (204), i.e., whether the total used air-to-ground bandwidth is less than or equal to a threshold, e.g., the maximum air-to-ground bandwidth allocated to the aircraft. If the air-to-ground bandwidth is insufficient, in-flight connectivity controller 1418 determines whether it is economical to transmit the sensor data from the aircraft using satellite communications system bandwidth allocated to the aircraft (208). If use of satellite bandwidth is economical, in-flight connectivity controller 1418 throttles user Internet services and/or other services otherwise allocated to satellite communications system (e.g., via the in-flight entertainment system) (218) to provide bandwidth for the sensor data transmission. In-flight connectivity controller 1418 determines whether any remaining air-to-ground bandwidth is sufficient for avionics data communications (206). If the air-to-ground bandwidth is insufficient, in-flight connectivity controller 1418 determines whether it is economical to send the flight-deck data transmission using satellite communications system bandwidth (208). If use of satellite bandwidth is economical, in-flight connectivity controller 1418 throttles user Internet services and/or other services allocated satellite communications system bandwidth (218) to provide bandwidth for avionics data transmission.

In addition, in-flight connectivity controller 1418 determines whether any air-to-ground bandwidth allocation is sufficient for flight crew services data transmission (210). If the air-to-ground bandwidth is insufficient, in-flight connectivity controller 1418 determines whether it is economical to send the flight crew services data transmission using any remaining satellite communications system bandwidth (208). If use of satellite bandwidth is economical, in-flight connectivity controller 1418 throttles user Internet services and/or other user services allocated satellite communications system bandwidth (218) to provide bandwidth for flight crew services data transmission. In-flight connectivity controller 1418 then determines whether the air-to-ground system bandwidth is sufficient for supporting other Internet service, e.g., to other user equipment on the aircraft (212). If not, then in-flight connectivity controller 1418 throttles the user Internet services (214). If the bandwidth is sufficient, then, all of the Internet services are communicated using an air-to-ground modem (216). Otherwise, in-flight connectivity controller 1418 throttles the other user Internet services and allocates any remaining service requests to the satellite system, if possible (214). Note that while the single air-to-ground transmission pipe is managed based on a particular prioritization scheme, and relies on the satellite transmission in cases of insufficient bandwidth, other prioritization schemes may be used. In at least one embodiment of in-flight connectivity controller 1418, an override selection may be made that gives absolute priority to aircraft avionics under certain circumstances (e.g., emergency communications). In at least one embodiment, in-flight connectivity controller 1418 prioritizes different passenger services. For example, the in-flight entertainment system that is delivered to seat display terminals may be granted higher priority than other services being provided to user equipment in the aircraft cabin.

Referring back to FIG. 5, in at least one embodiment, the air-to-ground communications system is used for communications sessions that have relatively high-latency intolerance (e.g., video, voice-over-Internet-protocol, chatting, and gaming). However, under certain circumstances, the air-to-ground communications system may have poor performance (e.g., when the aircraft is located over a large body of water or performs a banking turn or engages in other orientation that degrades the air-to-ground signal quality), and in-flight communications system (e.g., in-flight connectivity controller 1418 of FIG. 10) coordinates a hand-off of a communications session from the air-to-ground communications system to the satellite communications system. Any suitable handover technique may be used. The air-to-ground system views one or more satellite systems as just other eNodeBs and uses simultaneous tunnels for the same user. However, when the air-to-ground communications system signal quality improves, another handoff occurs to restore the communications session to the air-to-ground communications system. Note that under other circumstances, satellite communications may be selected and handoff to the air-to-ground communications system may occur in response to degradation of the satellite communications system or improvement to the air-to-ground signal quality. Accordingly, when the satellite communications system performance improves, another handoff occurs to restore the communications session from the air-to-ground communications system to the satellite communications system. In situations where bandwidth of a selected communications system is insufficient to satisfy a minimum required capacity of a particular communications session, in-flight connectivity controller 1418 queues the communications session. In addition, in-flight connectivity controller 1418 adjusts bandwidth allocated to any particular communications session in response to an event having a prioritization level higher than the prioritization level of the communications session (e.g., avionics or crew communications needing additional bandwidth for emergency communications).

Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium.

The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. An apparatus for communications on an aircraft comprising:
    first equipment comprising:
        a first modem configured to process signals communicated with a non-terrestrial relay point;
        a second modem configured to process signals communicated with a terrestrial relay point;
    a wireless local area access node configured to communicate with user equipment on the aircraft;
    a small cell access node configured to communicate with user equipment on the aircraft;
    avionics equipment; and
    a controller configured to manage first data streams between the small cell access node and the first equipment and configured to manage second data streams between the wireless local area access node and the first equipment, the controller being further configured to manage third data streams between the avionics equipment and the first equipment.

2. The apparatus, as recited in claim 1, further comprising:
    an aircraft communications interface configured to provide aircraft personnel access to the controller.

3. The apparatus, as recited in claim 1, wherein the controller comprises:
    a storage element configured to store routing information; and
    a router configured to pass data between the small cell access node and the first equipment according to the routing information and further configured to pass data between the wireless local area access node and the first equipment according to the routing information.

4. The apparatus, as recited in claim 1, further comprising:
    a first antenna comprising a plurality of antennas disposed on a lower surface of an exterior of the aircraft, the plurality of antennas being disposed to provide a target antenna gain over a range of aircraft orientations with respect to a ground antenna of an associated ground facility of a terrestrial relay communications system.

5. The apparatus, as recited in claim 4, wherein the first antenna is configured to receive signals in multiple non-overlapping frequency bands.

6. The apparatus, as recited in claim 1, wherein the first equipment further comprises:
    a first radio coupled to the first modem, the first radio comprising a Ka band radio and a Ku band radio.

7. The apparatus, as recited in claim 1, wherein the first equipment further comprises a third modem configured to communicate over a non-terrestrial relay frequency band.

8. The apparatus, as recited in claim 1, wherein the first equipment further comprises:
    a first radio comprising:
        the first modem coupled to the controller;
        a first transceiver coupled to the first modem, the first transceiver being configured to further process the signals communicated with the non-terrestrial relay point; and
        a first antenna coupled to the first transceiver; and
    a second radio comprising:
        the second modem coupled to the controller;
        a second transceiver coupled to the second modem, the second transceiver being configured to further process the signals communicated with the terrestrial relay point; and
        a second antenna coupled to the second transceiver.

9. The apparatus, as recited in claim 1, wherein the aircraft comprises:
    a first antenna configured to communicate signals having a first power spectral density between the small cell access node and the user equipment over a first frequency band; and
    a second antenna configured to communicate signals having a second power spectral density between the wireless local area network access node and the user equipment over a second frequency band, the first power spectral density and the first frequency band being different from the second power spectral density and the second frequency band, respectively.

10. The apparatus, as recited in claim 1, wherein at least one of the first wireless local area access node, the small cell access node, and a second wireless local area access node is configured to communicate information with ground equipment external to the aircraft, and the apparatus further comprises:
    an in-flight entertainment system configured to communicate with seat display terminals of the aircraft,
    wherein the controller is configured to update the in-flight entertainment system with the information.

11. The apparatus, as recited in claim 1, wherein the small cell access node is compliant with at least one of 3G and Long Term Evolution standards.

12. A method for operating a communications system on an aircraft comprising:
    communicating first data streams between a controller and first equipment on the aircraft using a first wireless protocol and first power spectral density mask;
    communicating second data streams between the controller and second equipment on the aircraft using a second wireless protocol and second power spectral density mask;
    communicating the first data streams between the controller and third equipment, the third equipment comprising a first modem and a second modem, the first modem being configured to process signals communicated with a non-terrestrial relay point and the second modem being configured to process signals communicated with a terrestrial relay point; and communicating the second data streams between the controller and the third equipment.

13. The method, as recited in claim 12, further comprises:
communicating a third data stream between avionics equipment and the controller; and
communicating the third data stream between the controller and at least one of the first modem and the second modem.

14. The method, as recited in claim 13, further comprises:
communicating a fourth data stream between display terminals of an in flight-entertainment system of the aircraft and the controller.

15. The method, as recited in claim 14, further comprises:
communicating at least one of the first, second, third, and fourth data streams with ground equipment external to the aircraft.

16. The method, as recited in claim 12, further comprising:
allocating aircraft-area bandwidth to communications sessions corresponding to the first, second, third, and fourth data streams between equipment on the aircraft and the controller according to a prioritization level of the equipment on the aircraft, the prioritization level of the equipment being selected from a plurality of prioritization levels based on a type of the equipment on the aircraft, the plurality of prioritization levels including a prioritization level of aircraft passenger user equipment, a prioritization level of avionics equipment, a prioritization level of an in-flight entertainment system, and a prioritization level of aircraft personnel communications equipment; and
communicating signals of the communications session using the aircraft-area bandwidth allocation.

17. An apparatus comprising:
means for controlling communications with equipment on an aircraft;
means for communicating first data streams between the means for controlling and first equipment on the aircraft using a first wireless protocol and first power spectral density mask;
means for communicating second data streams between the means for controlling and second equipment on the aircraft using a second wireless protocol and second power spectral density mask;
means for communicating a third data stream between avionics equipment and the controller;
means for communicating the third data stream between the controller and at least one of the means for communicating first data streams and the means for communicating second data streams;
means for communicating the first data streams, the second data streams, the third data stream, and a fourth data stream between the means for controlling and a first antenna; and
means for communicating the first data streams, the second data streams, the third data stream, and the fourth data stream between the means for controlling and a second antenna.

18. The apparatus as recited in claim 17,
wherein the means for controlling allocates aircraft-area bandwidth to a communications session associated with the first data streams according to the prioritization level of the first equipment on the aircraft, the prioritization level being selected from a plurality of prioritization levels based on a type of the equipment on the aircraft, the plurality of prioritization levels including a prioritization level of aircraft passenger user equipment, a prioritization level of avionics equipment, a prioritization level of an in-flight entertainment system, and a prioritization level of aircraft personnel communications equipment, and
wherein the means for controlling allocates the communications session a first bandwidth allocation of a selected communications system selected from a non-terrestrial communications system and a terrestrial communications system, the allocating being based on a latency tolerance of the communications session and the prioritization level of the communications session.

19. An apparatus for communications on an aircraft comprising:
first equipment comprising:
a first modem configured to process signals communicated with a non-terrestrial relay point;
a second modem configured to process signals communicated with a terrestrial relay point;
a wireless local area access node configured to communicate with user equipment on the aircraft;
a small cell access node configured to communicate with user equipment on the aircraft;
a controller configured to manage first data streams between the small cell access node and the first equipment and configured to manage second data streams between the wireless local area access node and the first equipment; and
an in-flight entertainment system configured to communicate with display terminals of the aircraft,
wherein the controller is further configured to manage third data streams between the in-flight entertainment system and the first equipment.

20. The apparatus, as recited in claim 19, further comprising:
avionics equipment,
wherein the controller is further configured to manage fourth data streams between the avionics equipment and the first equipment.

* * * * *